United States Patent [19]

Suga et al.

[11] Patent Number: 5,170,026
[45] Date of Patent: Dec. 8, 1992

[54] METHOD AND APPARATUS FOR POSITIONING FIRST AND SECOND OBJECTS BASED ON A POTENTIAL DIFFERENCE

[75] Inventors: Tomoyuki Suga; Mitsutaka Sumita, both of Aichi, Japan

[73] Assignee: Mitsubishi Denki K.K., Tokyo, Japan

[21] Appl. No.: 735,560

[22] Filed: Jul. 25, 1991

[30] Foreign Application Priority Data

Jul. 25, 1990 [JP] Japan .................. 2-196491

[51] Int. Cl.⁵ .......................... B23H 7/02; B23H 7/18
[52] U.S. Cl. ............................. 219/69.12; 219/69.16; 324/71.1; 364/561
[58] Field of Search ............ 219/69.12, 69.16, 124.34, 219/69.13; 33/503, 504, 505; 324/73.1, 71.1, 122, 537, 543; 364/561

[56] References Cited

U.S. PATENT DOCUMENTS

| | | | |
|---|---|---|---|
| 3,809,308 | 5/1974 | Roeder et al. | 219/69.16 |
| 3,833,788 | 9/1974 | Hovance et al. | 219/124.34 |
| 4,324,970 | 4/1982 | Nanasawa et al. | 219/69.12 |
| 4,825,037 | 4/1989 | Spaude | 219/124.34 |
| 4,827,213 | 5/1989 | Spaude | 219/69.16 |

Primary Examiner—Geoffrey S. Evans
Attorney, Agent, or Firm—Sughrue, Mion, Zinn, Macpeak & Seas

[57] ABSTRACT

A contact point is estimated by detecting a variation of a potential difference between the first and the second object as the objects approach one another. The method and apparatus are particularly suited for use in an electrical discharge machine (EDM) that is controlled by a numerical control (NC) unit for machining a workpiece.

20 Claims, 6 Drawing Sheets

METHOD AND APPARATUS FOR POSITIONING FIRST AND SECOND OBJECTS BASED ON A POTENTIAL DIFFERENCE

BACKGROUND OF THE INVENTION

1. Field of the Invention

The present invention is directed to a positioning method and apparatus for defining the relative positions of a first object and a second object.

2. Description of the Related Art

The relative positions of a wire electrode and a workpiece of an electrical discharge machine (EDM) for performing electrical discharge machining must be defined accurately prior to the start of machining in order to ensure high machining accuracy.

To define the positional relationship, it is known in the art to provide the EDM with a contact position setting function which brings the electrode and the workpiece into direct contact and sets that contact position as a reference. The reference is used by a numerical control (NC) unit to control the positioning of the electrode and the workpiece relative to each other.

The prior art wire-cut EDM described above is shown in FIG. 5. The positioning of wire electrode 1 relative to the workpiece 2 is controlled by NC unit 15. More specifically, the workpiece 2 is positioned by moving table 3 in either the X or the Y direction, using corresponding motors 5 and 6. The wire electrode 1 is fed through the EDM by use of main tension rollers 7 and bottom rollers 8. A contact detector 14 detects the contact of the wire electrode 1 with the workpiece 2 and outputs the detection signal to NC unit 15.

An example of a typical contact detector 14 used in the prior art EDM is shown in FIG. 6. The detector 14 receives inputs from wire electrode 1 and the workpiece 2. A voltage source 10 supplies a contact detecting voltage to the machining gap. A comparator 11 compares the voltage level in the machining gap to determine whether there is contact between the wire electrode and the workpiece 2. The comparator 11 outputs a signal to the NC unit 15, indicating that contact has been determined (i.e., voltage $V = V_b$). A current limiting resistor 13 is used to limit the contact detecting voltage across the machining gap. A switch 12 can be used by the contact detector 14 to sample the gap voltage V alternately.

In operation, the NC unit 15 receives a command requesting a contact position setting operation to be performed. At this time, the contact detector 14 closes switch 12 and applies a voltage from source 10 across the machining gap via the current limiting resistor 13. The wire electrode 1 and the workpiece 2 begin approaching each other in accordance with commands output by the NC unit 15. During the operation, the gap voltage V is compared with a predetermined reference voltage $V_b$ with the comparator 11 to determine whether the wire electrode 1 and the workpiece 2 have made contact. When the gap voltage V becomes lower than the reference voltage $V_b$, an output signal is transmitted by the comparator 11 to the NC unit 15, as described above. At this point, the NC unit 15 causes the wire electrode 1 and the workpiece 2 to stop their approach, and the contact position setting operation is complete. The relationship between the machining gap distance and the gap voltage during the above-described contact position setting operation is shown in FIG. 7.

The gap voltage V can be represented by the following expression:

$$V = E - Ri \quad (1)$$

where E represents the output voltage of the voltage supply unit 10, R represents the resistance value of the current limiting resistor 13, and i represents the value of the current flowing from the voltage supply unit 10 to the machining gap via the current limiting resistor 13. Thus, it can be seen that the value of the current i is restricted by the resistance of the wire electrode 1 and the resistance of the machining gap. Assuming that the resistance of the wire electrode 1 is R1 and that of the machining gap is R2, the current i can be represented by:

$$i = E/(R + R1 + R2) \quad (2)$$

It should be noted that the resistance of the machining gap R2 reduces in proportion to the decrease in the gap distance. Hence, as the gap distance reduces, the current i increases and the gap voltage V decreases. The wire resistance R1 reduces in proportion to the increase in the diameter of the wire electrode 1.

For example, when a wire electrode 1 with a large diameter is to be machined with a workpiece 2 having a large thickness, the wire resistance R1 is small and the gap R2 decreases to a great degree as the wire electrode 1 and the workpiece approach each other (i.e., the machining gap distance decreases). In this case, the current i flowing in the machining gap increases when the wire electrode 1 and the workpiece 2 have not yet made contact, and the gap voltage V falls considerably as compared to the open voltage E, as shown in FIG. 8. In contrast, when a wire electrode 1 with a small diameter is used with a workpiece having a small thickness, the wire resistance R1 is large, and the gap resistance R2 decreases to a lesser degree as the wire electrode 1 and the workpiece 2 approach each other, hence the current i increases slightly and the gap voltage V falls slightly. When the wire electrode 1 and the workpiece 2 have made contact, the resistance of the wire electrode R1 is large and the area of contact is small as compared to the positioning of the wire electrode 1 with the large diameter and the workpiece 2 having a large thickness. The current i, then, and the gap voltage V are only slightly reduced.

As the reference voltage $V_b$ of the comparator 11 is fixed, the accuracy of the positioning in the prior art EDM varies according to the types of wire electrodes and workpieces used. For instance, if the contact voltage $V_2$ has been set to approximate the reference voltage $V_b$, a contact is detected considerably ahead of the contact position of the wire electrode 1 and the workpiece 2 during the positioning of a wire electrode 1 having a large diameter and a workpiece 2 having a large thickness. This is because the reference voltage $V_b$ (set approximately equal to V2) is higher than the actual contact voltage $V_1$, as shown in FIG. 8.

Similarly, if the contact voltage $V_1$ has been set to approximate the reference voltage $V_b$, a contact cannot be detected during the positioning of the wire electrode 1 having a small diameter and the workpiece 2 having a small thickness. In this case, the gap voltage V does not fall below the reference voltage $V_b$ due to the resistance R1 of the wire electrode 1. Hence, if the wire electrode 1 having a small diameter is positioned to contact the workpiece 2 having a small thickness, the reference voltage $V_b$ must be set to a value higher than the contact voltage $V_1$ in order for the actual contact to be detected accurately.

In addition, the prior art EDM may be exposed to galvanic corrosion, as shown in FIG. 9, caused by a large current flow in the machining gap. Commonly, in the final stages of the above-described positioning function the gap resistance reduces to an extremely small value as the gap distance approaches 0. As a result, large current may flow in the machining gap causing galvanic corrosion.

Moreover, where the actual contact could not be detected accurately, the workpiece 2 would make contact with a moving wire electrode 1 causing the wire electrode 1 to fray or create shavings, as shown in FIG. 10. Shayings 16 within the machining gap tend to make positioning impossible.

SUMMARY OF THE INVENTION

Accordingly, an object of the present invention is to overcome the disadvantages of the prior art by providing a method and apparatus for precisely positioning independent objects relative to each other.

It is a further object of the present invention to minimize the damage to either of the objects during positioning.

In accordance with the above objects, a first aspect of the present invention defines the relative positions of a first object and a second object by estimating the relative positions of the first and second objects in accordance with the variation of a potential difference between the two objects.

A second aspect of the present invention reduces the relative moving speeds of a first object and a second object before the relative positions of the first and second objects reach their destinations by estimating the relative positions of the first and second objects in accordance with the variation of a potential difference between the objects.

A third aspect of the present invention positions a first object and a second object by stopping the application of a voltage across the first and second objects during the relative positioning operation of the first and second objects performed after their relative positions of destination have been defined.

A fourth aspect of the present invention positions a first object and a second object by stopping the relative feeds of the first and second objects in a direction different from the on for the relative positioning operation of the first and second objects during the positioning operation performed after their relative positions of destination have been defined.

A fifth aspect of the present invention defines the relative positions of a first object and a second object by applying a voltage across the first and second objects, changing a gap between the first and second objects, detecting the voltage across the first and second objects and the variation of the gap at a plurality of detection points, comparing the slope of the gap variation versus voltage variation at the plurality of detection points, and estimating the relative positions of the first and second objects by means of the slope after the slope has become constant.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENT

Figure 1:
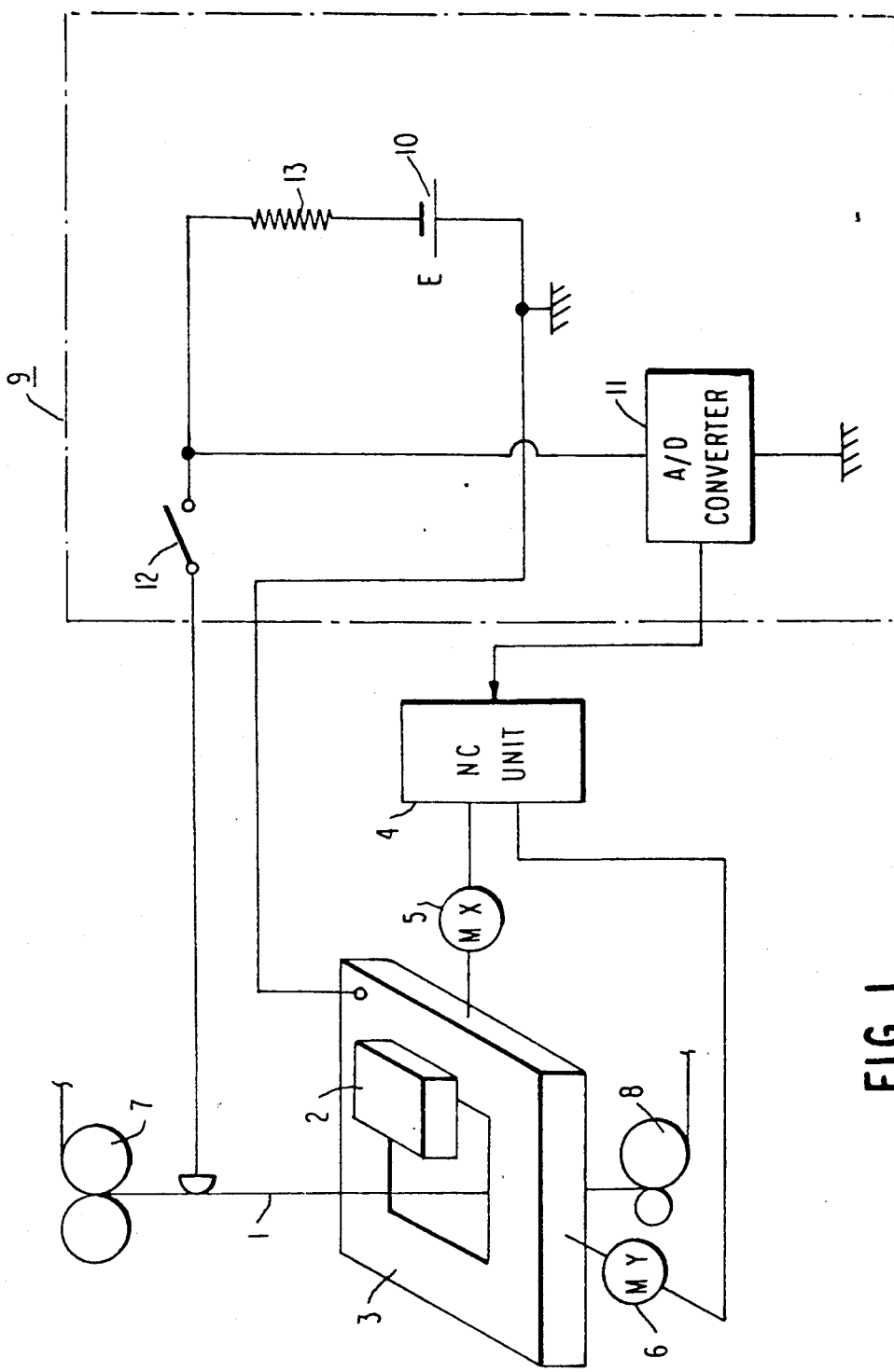
FIG. 1 is a diagram illustrating an EDM which is the preferred embodiment the present invention.
Figure 5:
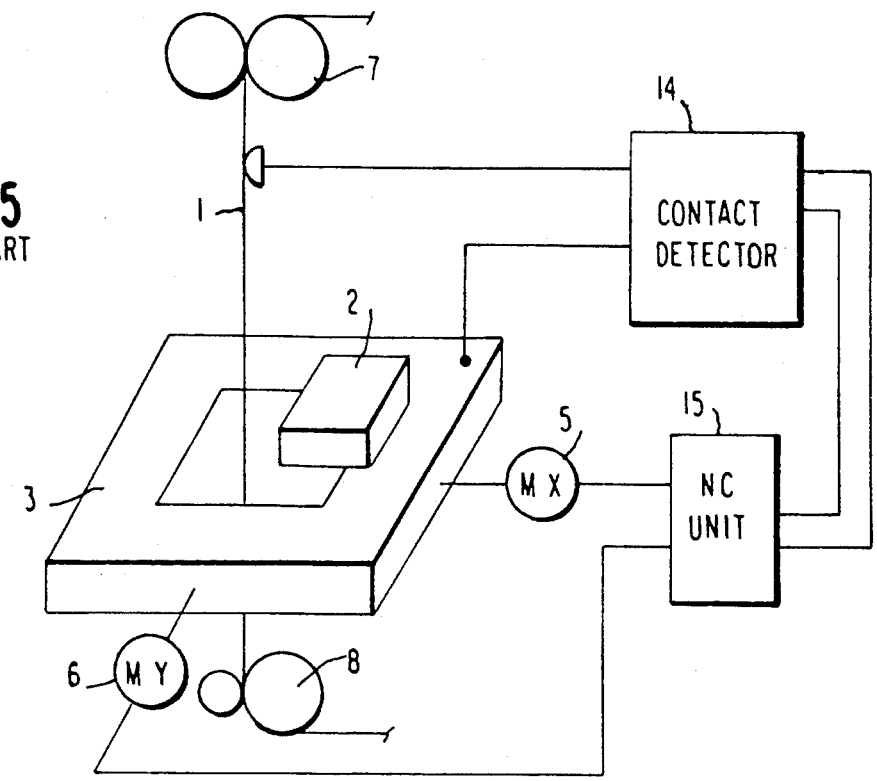
FIG. 5 is a block diagram of a known wire-cut EDM.
Figure 6:
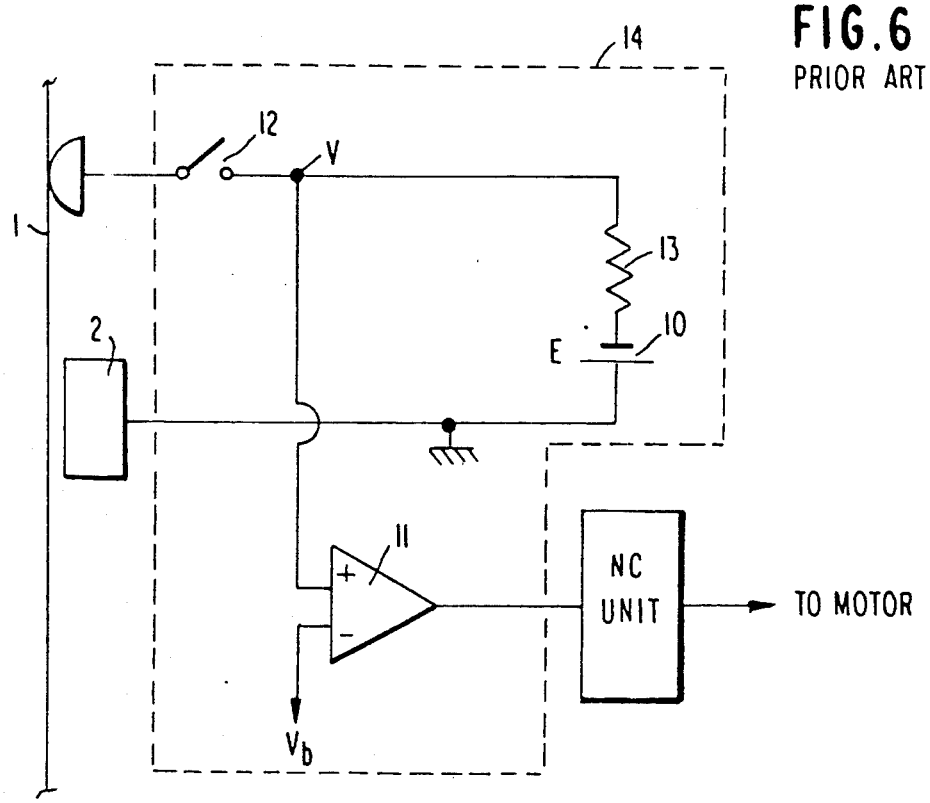
FIG. 6 is a diagram illustrating a known contact detector.
Figure 7:
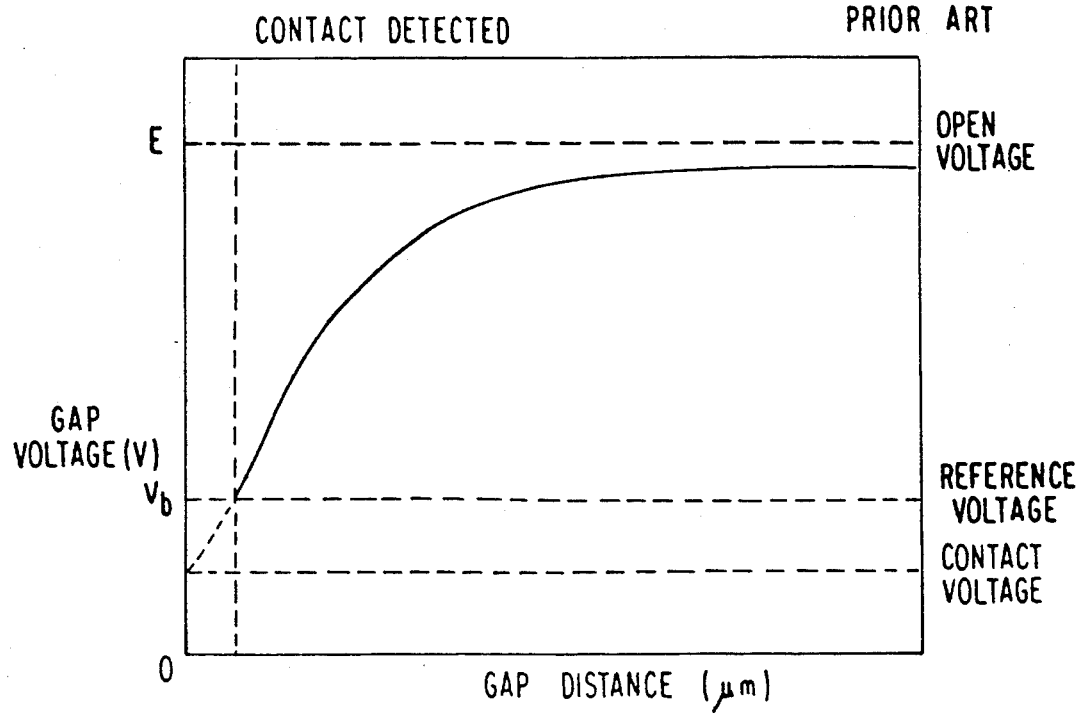
FIG. 7 is a graph illustrating a contact position setting operation using the known EDM.
Figure 8:
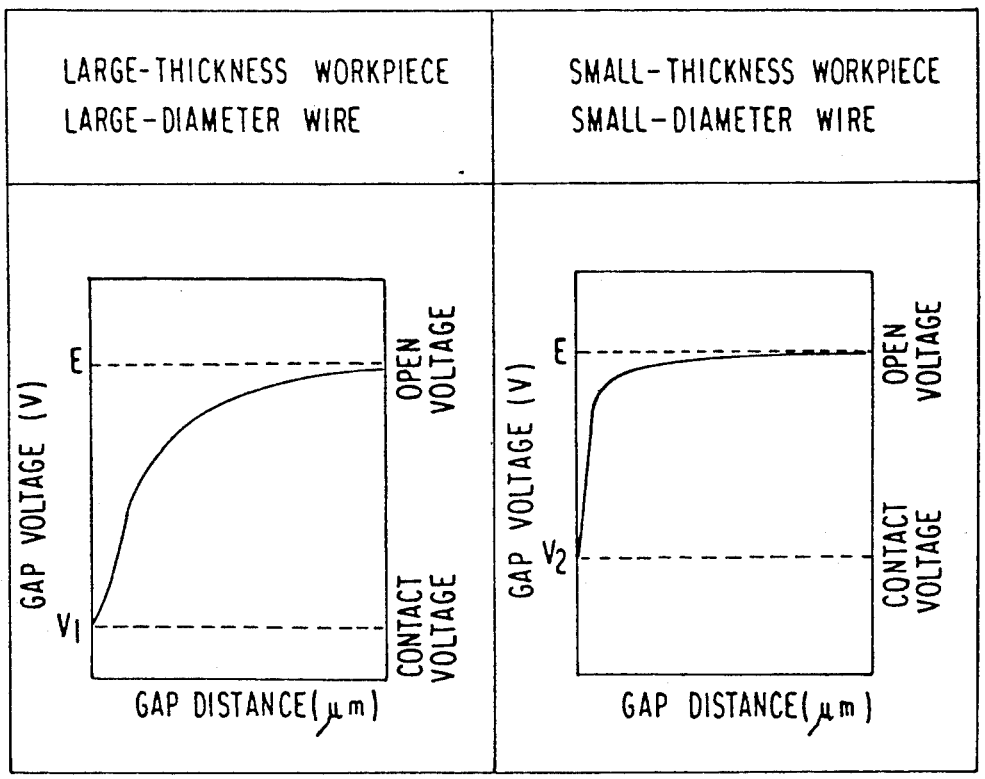
FIG. 8 is a pair of graphs illustrating gap voltage-distance curves for a large-thickness workpiece and a small-thickness workpiece.
Figure 9:
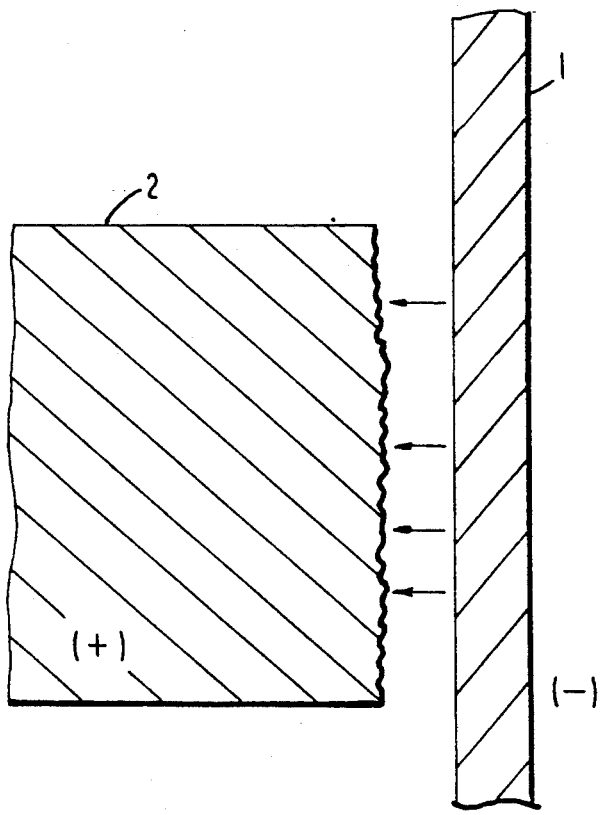
FIG. 9 illustrates damage of a workpiece due to galvanic corrosion of the wire electrode and workpiece.
Figure 10:
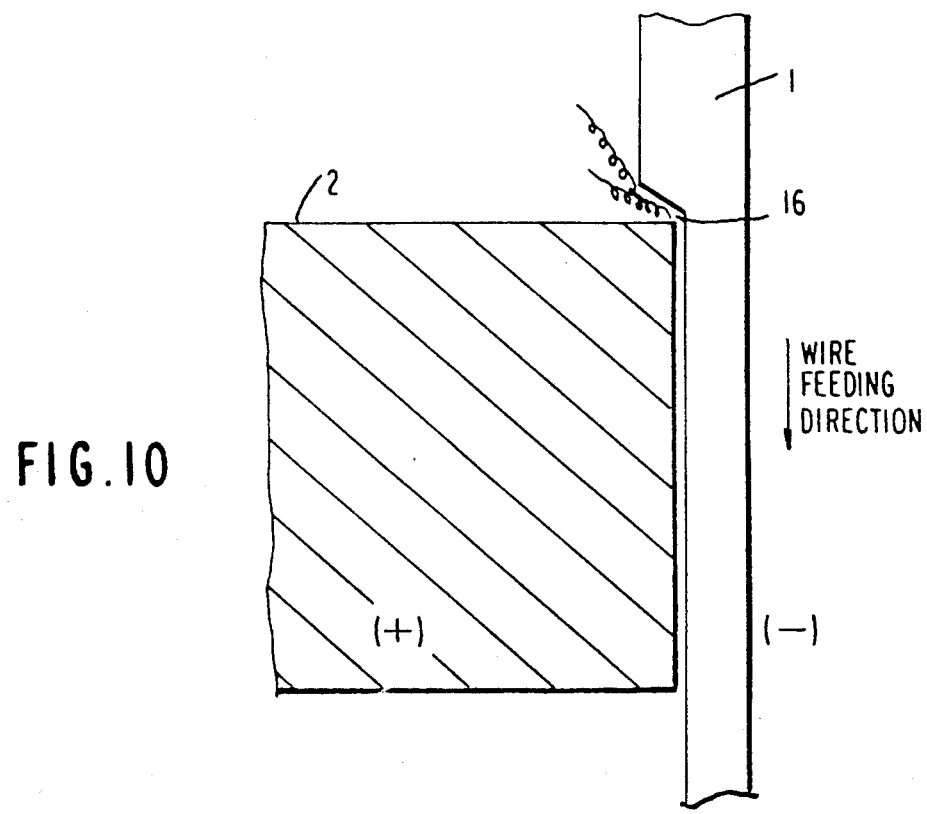
FIG. 10 illustrates positioning error produced by shavings of a workpiece caused by wire feeding during contact of the wire electrode with the workpiece.

FIG. 1 illustrates an EDM used to practice the present invention. The EDM is similar to the prior art EDM (FIG. 5), wherein corresponding parts are designated by like reference characters. As in the prior art, a wire electrode 1 and workpiece 2 are positioned in accordance with commands output by NC unit 4 prior to machining of the workpiece 2 by the EDM. However, in accordance with the present invention, an improved machining gap voltage detector 9 and NC unit 4 are employed to more accurately and efficiently perform a contact position setting function.

Figure 2:
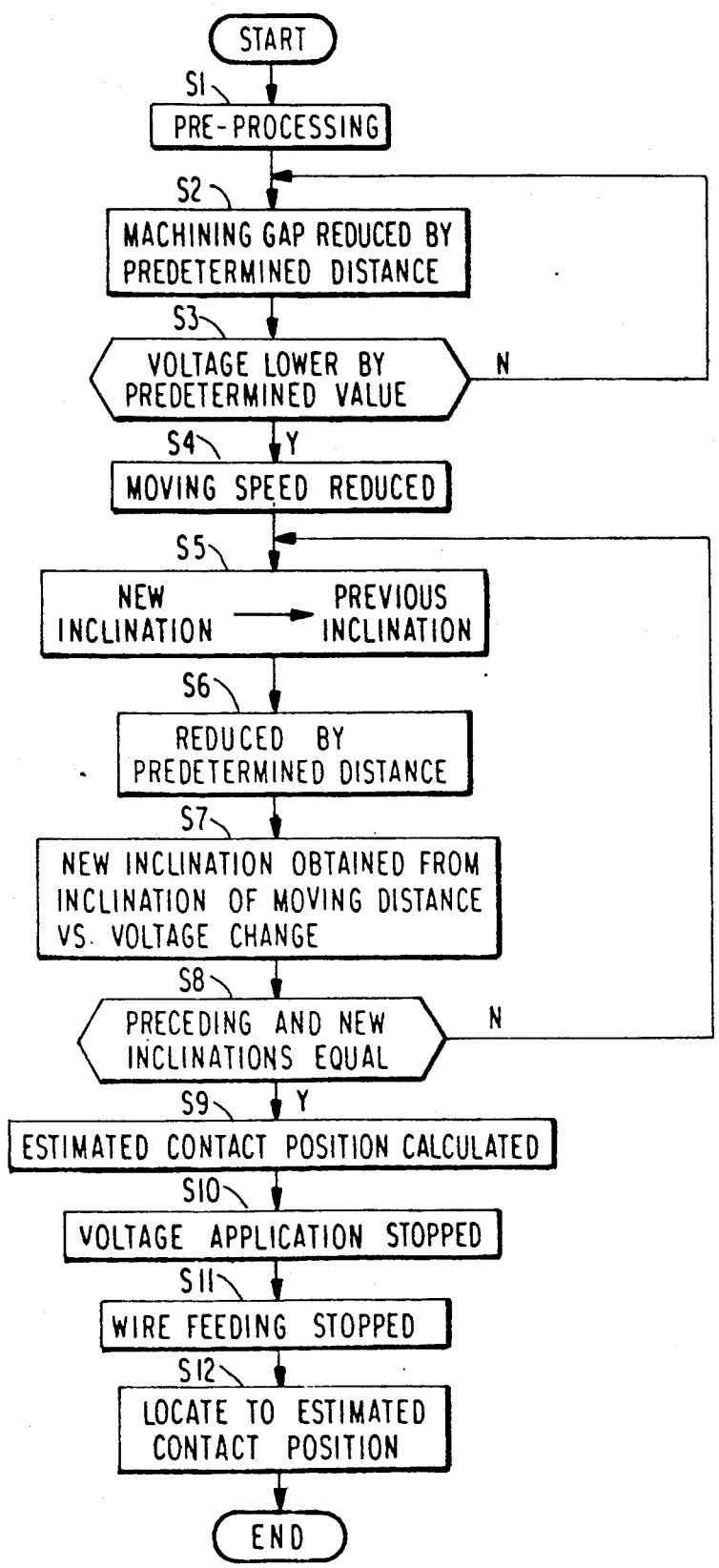
FIG. 2 is a flow chart of a positioning program according to the present invention, which is stored in the memory of an NC unit for use with the device shown in FIG. 1.

The NC unit 4 controls the EDM during a contact position setting function in accordance with a program stored therein. FIG. 2 illustrates a flow chart of a contact position setting program stored in the memory of the NC unit 4. The steps are described as follows.

S1: The wire 1 is fed and tensioned. The switch 12 is then closed, and a voltage is applied by the voltage supply unit 10 to the machining gap via the current limiting resistor 13. The relative approach speed and direction of the wire 1 and workpiece 2 are set. The slope of the variation of the gap voltage with respect to a previous positioning period (hereinafter referred to as the "slope" or "inclination" ) and a new inclination is set to 1000. Any value may be defined instead of 1000 as long as its absolute value is much greater than 0.

S2: The wire 1 and workpiece 2 are then relatively moved a certain distance so as to come closer (e.g., several $\mu$m) to each other.

S3: The gap voltage V is converted into a digital value by the analog-to-digital converter 11 of the machining gap voltage detector 9. This voltage is compared with an open voltage E to determine whether it is lower by a predetermined level (e.g., an 80% point) or not. If the gap voltage V has not reached the predetermined level, the processing of S2 is repeated until the gap voltage V is lower than the predetermined level. The point where the gap voltage V is lower than the open voltage E by the predetermined level is the sampling starting position.

S4: The relative moving speed between the wire and workpiece is reduced to a speed such that measurement or sampling of the gap voltage V occurs once per each reduction of the machining gap by 1 μm.

S5: The current inclination becomes the preceding or previous inclination.

S6: The machining gap is then reduced by a distance indicated by l (e.g., 1 μm) in FIG. 3 and sampling points (gap voltage V) are stored. The value of l need not be kept constant.

S7: A new inclination is obtained.

S8: The preceding inclination is compared with the new inclination. If they are not substantially equal (e.g., error not within ±10%), then steps S5, S6 and S7 are repeated.

Figure 3:
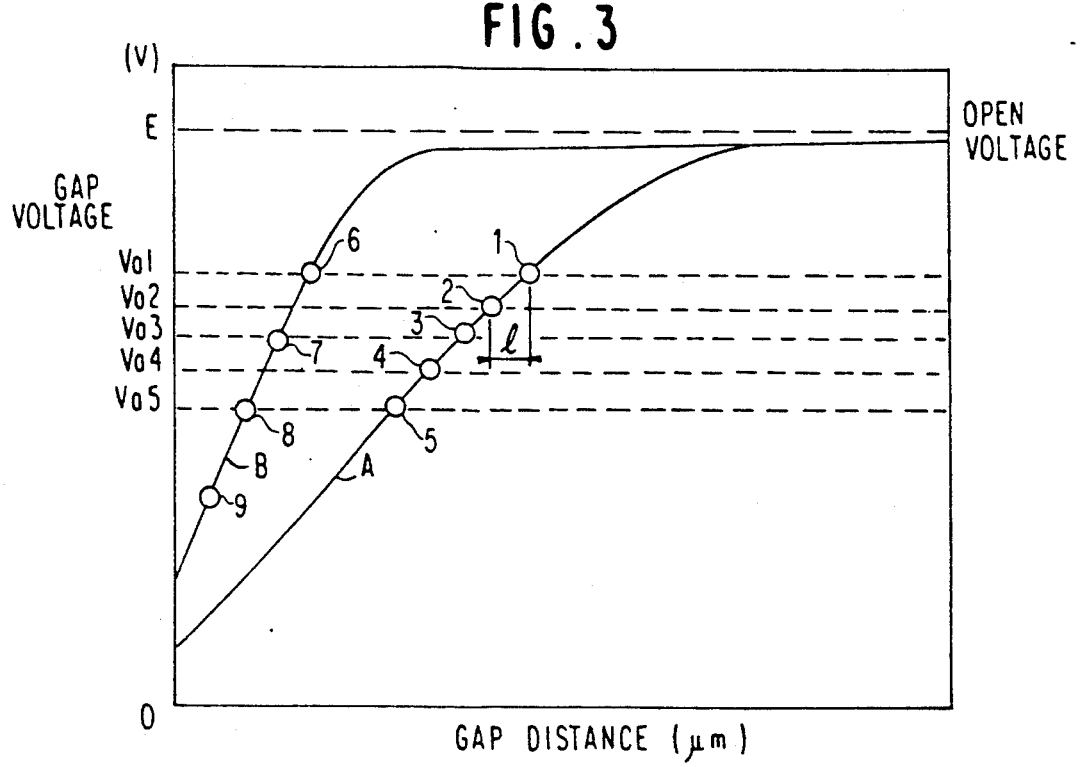
FIG. 3 illustrates various sampling points of two gap voltage-distance curves.

The processing of steps S5 to S8 will now be described with reference to FIG. 3.

For curve A, the preceding inclination (between sampling points 1 and 2) and the new inclination (between sampling points 2 and 3) are calculated as follows:

Preceding inclination $Da1 = (Va1 - Va2)/l$
New inclination $Da2 = (Va2 - Va3)/l$
where, here, $l = 1$ μm Here, the preceding and new inclinations are equal, which means that the sampling points have a linear characteristic (i.e., are on the same straight line). (Three points have been defined by way of example, and three or more points are acceptable.) This indicates that the gap voltage is comparatively stable and is not affected by the workpiece thickness, wire diameter, etc. In consideration of measurement error, the sampling points are determined to be on the same straight line if the slope variance is within 10%, thus the following equation must be satisfied:

$$0.9 < Da1/Da2 < 1.1$$

If the inclinations do not match within the above error (i.e., ±10%), the gap voltage variation with gap distance is not yet linear. Therefore, new sampling points must be taken and the above processing steps (i.e., S5-S8) repeated until a sequence of sampling points are determined to be on the same straight line.

S9: The contact position is estimated.

The processing of S9 will now be described with reference to FIG. 4. The estimated contact position is calculated using inclination Da4 obtained when sampling points 3, 4, 5 on the curve A have been determined to be on the same straight line:

$$Da4 = (Va4 - Va5)/l$$

Figure 4:
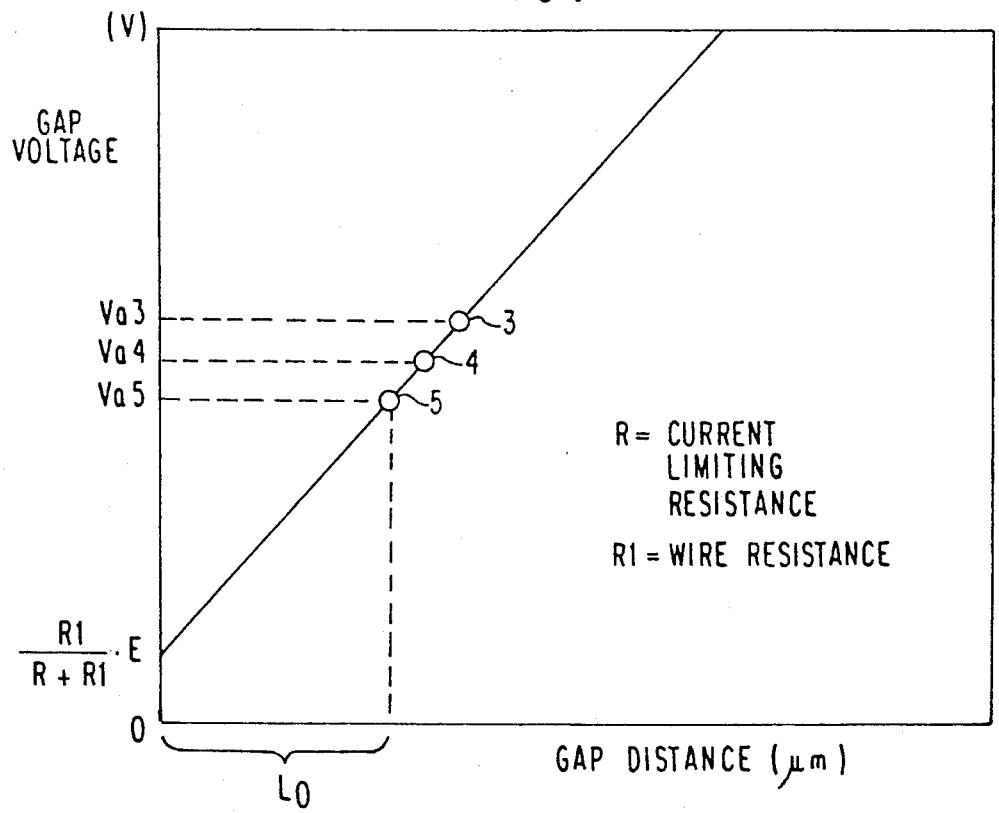
FIG. 4 illustrates three sampling points on the gap voltage-distance curve having a linear characteristic used to estimate a contact detection voltage in accordance with the present invention.

A straight line passing through the sampling point 5, shown in FIG. 4, will contact the abscissa (gap distance=0) at an estimated contact position at distance $L_0$ ahead of the sampling point 5. Distance $L_0$ is calculated as follows, where:

R = current limiting resistor value (Ω)
E = DC power supply output (V)
i = current flowing in the machining gap (A)
R1 = wire electrode resistance (Ω)
R2 = gap resistance (Ω)
ρ = dielectric resistance ratio (Ω/m)
L = gap distance $$R2 = \rho L \quad (3)$$

The gap voltage V is represented as follows by using expressions (1), (2) and (3):

$$V = E(1 - R/(R + R1 + \rho L)) \quad (4)$$

The contact voltage at the estimated contact position is obtained as follows from expression (4) since the gap distance L becomes zero is at the contact position:

$$\lim_{L \to 0} \left\{ E\left(1 - \frac{R}{R + R1 + \rho L}\right) \right\} = E \cdot \frac{R1}{R + R1} \quad (5)$$

The inclination at this time is as follows from expression (4):

$$\lim_{L \to 0} \left\{ E \frac{d}{dL}\left(1 - \frac{R}{R + R1 + \rho L}\right) \right\} = \quad (6)$$

$$\lim_{L \to 0} \left\{ \frac{E\rho R}{(R + R1 + \rho L)^2} \right\} = \frac{E\rho R}{(R + R1)^2}$$

Since the inclination at the estimated contact position is approximately equal to the inclination Da4, the following expression is established:

$$R1 = \sqrt{\frac{E\rho R}{Da4}} - R \quad (7)$$

Assuming that Va5 is the gap voltage at the sampling point 5, the distance $L_0$ from the sampling point 5 to the estimated contact position is as follows:

$$L_0 = (Va5 - E \cdot R1/(R + R1))/Da4 \quad (8)$$

Thus, a point reduced by a gap distance of $L_0$ from the current position (sampling point 5) becomes the estimated contact position.

S10: The voltage application is stopped.

The switch 12 is opened and the voltage application to the machining gap is stopped.

S11: Wire feeding is stopped.

S12: Positioning is performed to the estimated contact position obtained at S9.

The estimated contact position for the curve B using a small-diameter wire and a small-thickness workpiece can also be obtained in the same manner as described for curve A.

The above embodiment has been described with reference to a wire-cut EDM using a water dielectric. It can easily be shown that a similar operation can be performed using equivalent principles when the EDM uses an oil-based dielectric.

Further, the present invention is not limited to the relative positioning of a wire electrode and a workpiece in an EDM, but is applicable to a variety of positioning devices which define the relative positions of objects.

It will be apparent that the invention, as described above, defines the relative positions of first and the second objects by estimating the relative positions of the first and second objects in accordance with the variation of a potential difference between detected sampling points, so that precision positioning can be performed without affect due to the shapes, types, or other conditions of the objects.

The present invention, thus, can be used to reduce the relative moving speeds of first and second objects before the objects reach their relative destinations. By detecting a potential difference between the objects, the relative position destinations can be reached accurately in a short time in accordance with the present invention.

Furthermore, damage to either of the first or second objects can be prevented by stopping the application of a voltage across the objects during the latter part of the positioning operation, or by stopping the relative feeds of the objects when abnormal contact has been made during the machining operation.

Many features and advantages of the invention are apparent from the detailed specification and thus it is intended by the appended claims to cover all such features and advantages of the invention which fall within the true spirit and scope thereof. As numerous modifications and changes will readily occur to those skilled in the art, the invention is not to be limited to the exact construction and operation illustrated and described above. Accordingly all suitable modifications and equivalents are to be considered within the scope of the invention.

We claim:

1. A positioning device for determining and controlling the relative positions of two objects, the device comprising:
   (a) first and second objects;
   (b) moving means for relatively moving said first and second objects;
   (c) detecting means for detecting the potential difference between said first and second objects, and for generating an output indicative of said detected potential difference;
   (d) a controller operatively coupled with said moving means and said detecting means so as to receive said output and estimate a relative destination position of said first and second objects, said controller also controls said moving means during a positioning operation in accordance with said output and said estimated relative destination position.

2. The positioning device of claim 1, wherein said detecting means comprises a voltage source for applying a voltage potential across a gap between said first and second objects, and wherein said estimated destination position is a position where said first and second objects make contact with one another.

3. The positioning device of claim 2, wherein said control means periodically samples said output and determines when at least three consecutive samples have a linear characteristic, said controller estimating said relative destination position from said linear characteristic.

4. The positioning device of claim 3, wherein said device is implemented in an numerically controlled electrical discharge machine (EDM).

5. A positioning method for defining relative positions of a first object and a second object in accordance with a potential difference between the first and second objects, said method comprising the steps of:
   (a) measuring a variation of the potential difference between the first and second objects with position; and
   (b) estimating the relative destination positions of the first and second objects in accordance with the variation measured.

6. A positioning method as recited in claim 5, further comprising the step of:
   stopping the application of a voltage across the first and second objects during a relative position setting operation of the first and second objects performed after the relative destination positions have been defined.

7. A positioning method as recited in claim 5, further comprising the step of moving the first and second objects closer together, and
   wherein the first and second objects are positioned by stopping said moving of the first and second objects towards one another during a relative position setting operation of the first and second objects performed after the relative destination positions have been defined.

8. A positioning method for defining relative positions of a first object and a second object by moving the first and second objects closer to each other while measuring a potential difference between the first and second objects, said method comprising the steps of:
   (a) measuring a variation of the potential difference between the first and second objects with position;
   (b) estimating the relative destination positions of said first and second objects in accordance with the variation measured: and
   (c) reducing the relative approach speed of the objects before the first and second objects reach the relative destination positions.

9. A method for positioning a first object in contact with a second object by reducing a gap between the first and second objects, said method comprising the steps of:
   (a) producing a gap voltage across the gap;
   (b) moving the first object and the second object closer together by reducing the gap by a predetermined amount;
   (c) determining the gap voltage versus the gap; and
   (d) estimating a contact position when said determining in step (c) indicates the variation in said gap voltage has become substantially linear.

10. A method as recited in claim 9, wherein said method further comprises the step of: (e) positioning the first object in contact with the second object in accordance with the contact position estimated in step (d).

11. A method as recited in claim 9, wherein said method further comprises the step of (f) removing, between steps (d) and (e), the gap voltage from the gap.

12. A method as recited in claim 9, wherein said moving in step (b) comprises the steps of:
   (b1) moving the first object and the second object closer together by reducing the gap by a first predetermined incremental distance;
   (b2) comparing the gap voltage with a predetermined level of a maximum gap voltage;
   (b3) repeating steps (b1) and (b2) until said comparing in step (b2) indicates the gap voltage is less than the predetermined level of the maximum gap voltage; and
   (b4) moving, after said comparing in step (b2) indicates the gap voltage is less than the predetermined level of the maximum gap voltage, the first object and the second object closer together by reducing the gap by a predetermined amount.

13. A method as recited in claim 9, wherein said estimating in step (d) comprises the step of repeating steps (b) and (c) until the variation determined in step (c) becomes substantially constant.

14. A method as recited in claim 13, wherein said estimating in step (d) comprises the step of repeating steps (b) and (c) until the variation determined in step (c) becomes substantially linear.

15. A method as recited in claim 14, wherein said method further comprises the step of: (f) removing, between steps (d) and (e), the gap voltage from the gap.

16. A method as recited in claim 15, wherein said moving in step (b) comprises the steps of:
- (b1) moving the first object and the second object closer together by reducing the gap by a first predetermined incremental distance;
- (b2) comparing the gap voltage with a predetermined level of a maximum gap voltage;
- (b3) repeating steps (b1) and (b2) until said comparing in step (b2) indicates the gap voltage is less than the predetermined level of the maximum gap voltage; and
- (b4) moving, after said comparing in step (b2) indicates the gap voltage is less than the predetermined level of the maximum gap voltage, the first object and the second object closer together by reducing the gap by a predetermined amount.

17. A method of determining the relative positions of first and second objects separated by a gap, said method comprising the steps of:
- (a) producing a gap voltage across the gap;
- (b) sampling the gap voltage at a first sampling point;
- (c) moving the first object and the second object closer together by reducing the gap by a predetermined amount;
- (d) sampling, after step (c), the gap voltage at a second sampling point;
- (e) calculating a first slope based on the predetermined amount and a difference in the gap voltage for the first and second sample points;
- (f) moving the first object and the second object closer together by reducing the gap by the predetermined amount;
- (g) sampling, after step (f), the gap voltage at a third sampling point;
- (h) calculating a second slope based on the predetermined amount and a difference in the gap voltage for the second and third sample points; and
- (i) estimating a distance to a contact position when the first and second slopes are substantially constant.

18. A method as recited in claim 17, wherein said method further comprises the step of (j) positioning the first object in contact with the second object in accordance with the contact position estimated in step (i).

19. A method for positioning a workpiece in contact with an electrode of an electrical discharge machine by reducing a machining gap between the workpiece and the electrode, said method comprising the steps of:
- (a) applying a first voltage across the machining gap;
- (b) moving the workpiece and the electrode closer together by reducing the machining gap by a first predetermined amount;
- (c) detecting a gap voltage across the machining gap;
- (d) determining whether the gap voltage is lower than the first voltage by a predetermined level;
- (e) moving the workpiece and the electrode closer together by reducing the machining gap by a second predetermined amount when step (d) determines that the gap voltage is lower than the first voltage by the predetermined level, the second predetermined amount being less than the first predetermined amount;
- (f) determining a current inclination Of the gap voltage versus the machining gap;
- (g) comparing the current inclination with a previous inclination;
- (h) repeating steps (e)-(g) using the current inclination as the previous inclination until the current inclination subsequently determined in step (f) and the previous inclination are substantially equal;
- (i) estimating a contact position based on the current inclination; and
- (j) removing the supplied voltage from the machining gap.

20. A method as recited in claim 19, wherein said method further comprises the step of:
- (k) positioning the workpiece in contact with the electrode in accordance with the contact position estimated in step (i).

* * * * *